March 22, 1955  C. F. SCHWAN  2,704,693
RADIALLY ADJUSTABLE BEARING SUPPORT
Filed April 28, 1950  2 Sheets-Sheet 1

INVENTOR.
CLARENCE F. SCHWAN
BY Alfred C. Body
ATTORNEY

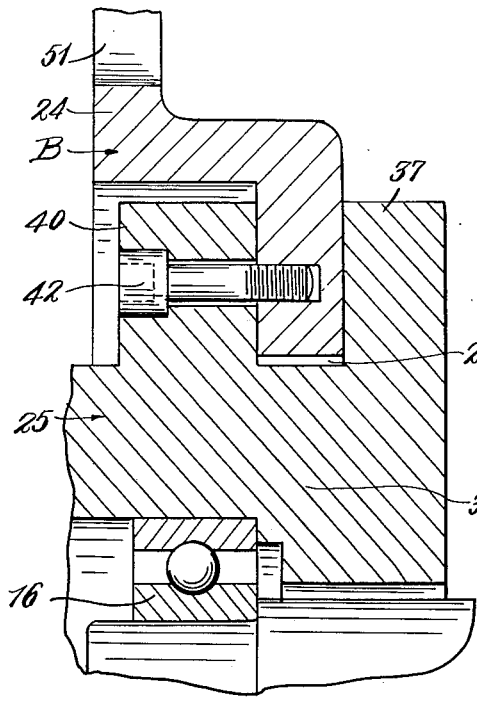
FIG. 3
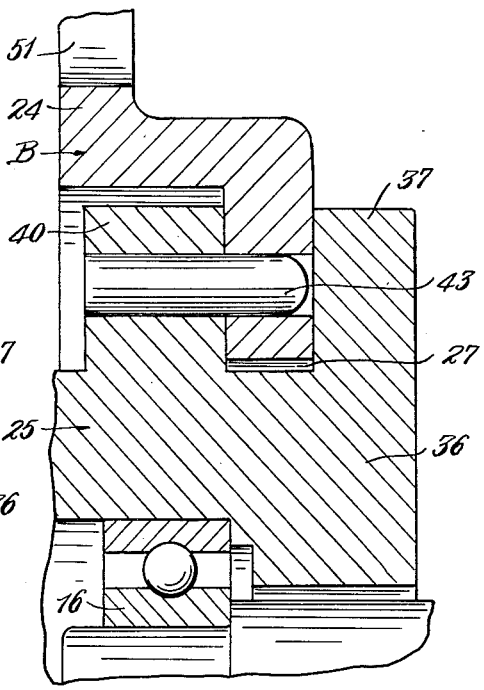
FIG. 4
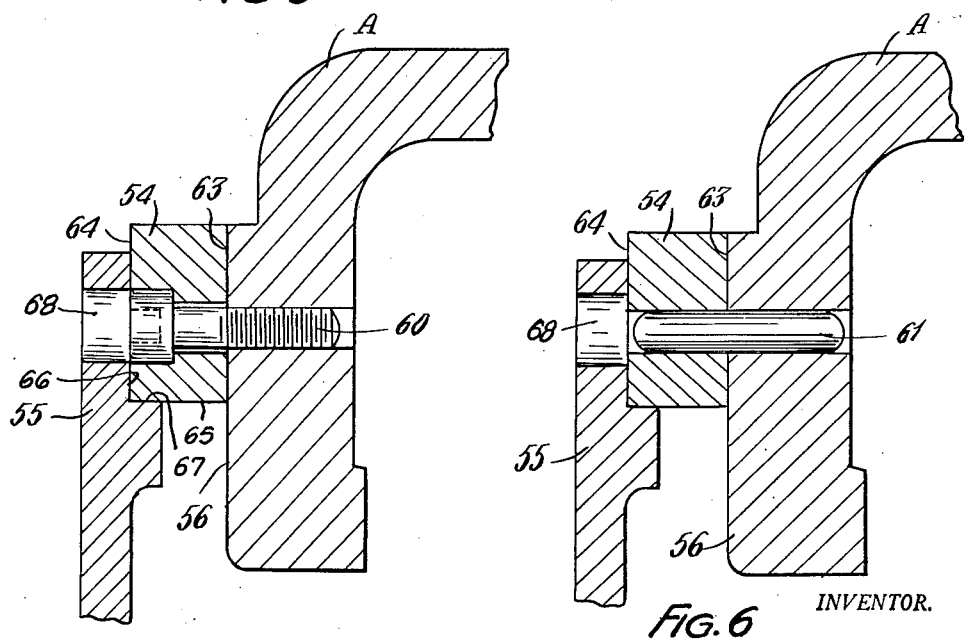
FIG. 5
FIG. 6
INVENTOR.
BY CLARENCE F. SCHWAN
Alfred C. Body
ATTORNEY United States Patent Office 2,704,693
Patented Mar. 22, 1955

2,704,693

RADIALLY ADJUSTABLE BEARING SUPPORT

Clarence F. Schwan, Warrensville Heights, Ohio, assignor to The Ohio Crankshaft Company, Cleveland, Ohio, a corporation of Ohio Application April 28, 1950, Serial No. 158,829

4 Claims. (Cl. 308—22)

This invention pertains to the art of electric motors and generators and, more particularly, to the outer shell for housing such equipment and the method of constructing same.

The invention is particularly adaptable to motor generators of the high-frequency alternator type and it will be described with reference to such generators, although it is not so limited.

Such motor generators normally comprise a motor and alternator all located within a multipiece shell, including a housing member for the stator winding and a pair of end bells, one at each end of the housing which positions the rotor relative to the stator and support it for rotation.

One important factor in the performance of a high-frequency alternator is the clearance between the surfaces of the rotor and the surfaces of the stator. The smaller the clearances are, the smaller the machine can be for a given power output and the higher the efficiency will be. As these clearances become smaller and smaller, the problem of adjusting and maintaining the clearances; that is, the alignment of the rotor relative to the stator, becomes of prime importance. The control of these clearances is so critical and so important that conventional manufacturing tolerances on metal parts is insufficient to insure that the clearance will be satisfactory upon assembly of the parts. It is customary, therefore, to adjust the clearances upon assembly of the motor-alternator set and then to make this adjustment permanent. Heretofore, in order to accomplish this adjustment, the housing and end bells have been so formed that they may be relatively adjusted radially of the axis of rotation. A machine is assembled, the end bells adjusted so as to provide the proper clearance of the rotor to the stator and then the end bells are securely bolted to the housing member. To further secure the permanence of this adjustment, it is normally conventional to drill the end bell and the housing and insert tight-fitting dowels into these drilled openings.

Such a construction and method of assembly has proven satisfactory within the manufacturing establishment of the manufacturers. However, in the event the end bell must be removed for any reason, such as maintenance of the bearings, repairs or otherwise, the dowels become bent or otherwise distorted so that the replacement of the end bell in the exact relative position that it was in before removal becomes almost an impossibility. It has, accordingly, become necessary in the field to realign the rotor relative to the stator, drill new holes and insert new dowel pins in these holes. This is a difficult operation to perform in the field and is expensive.

The present invention contemplates a shell construction, for equipment of the type referred to, which obviates all of the above difficulties and enables a fixed adjustment upon initial assembly for accurately aligning the rotor relative to the stator; but which, in addition, permits disassembly and reassembly of the housing and end bells with automatic and inherent realigning of the rotor relative to the stator.

In accordance with the present invention, the shell is assembled from a housing member for the stator and end bells, each formed of at least two members, the members of each end bell and the housing member being so constructed and arranged that a pair of the members may be disassembled and reassembled with accurate radial realignment while the other member and one of the pairs are radially adjustable in a fixed and generally permanently assembled manner.

In accordance with a preferred embodiment of the invention, a housing member is provided which is relatively conventional in structure and supports the stator. A pair of end bells are provided, one for each end of the housing, which support the rotor relative to the stator. A third member is mounted between the housing member and end-bell member and is in the shape of a ring having flat radial surfaces engaging similar flat radial surfaces on the end of the housing member. This ring is radially adjustable relative to the housing and is fixed in any adjusted position by suitable means such as dowels and/or threaded bolts. The end-bell member has outwardly-facing, circumferentially-extending surfaces which engage complementary, oppositely-facing, circumferential surfaces on the ring which serve to accurately align and position these two members radially upon assembly or reassembly. These members are held in assembled relationship by suitable means such as threaded bolts.

In accordance with an alternative embodiment of the invention, the ring and housing may have circumferentially-extending, complementary mating surfaces for accurately positioning these two members relative to each other upon each assembly. The end-bell member which supports the rotor itself then has flat radial surfaces engaging similar flat radial surfaces on the ring member so as to be radially adjustable relative thereto. Dowels and threaded bolts then fixedly retain the two members of the end bell in any adjusted position.

An object of the invention is the provision of a new and improved shell construction for equipment of the type referred to wherein provision is made for adjusting and aligning the rotor relative to the stator upon the initial assembly and, subsequently thereto, the shell may be disassembled for reassembly without the need for realigning the rotor and stator.

Another object of the invention is the provision of a new and improved shell construction for equipment of the type referred to, including a first and second member having mating complementary surfaces so as to insure exact duplication of relative position of the two members upon disassembly and reassembly and a third member fixedly adjusted relative to the second.

The invention may be embodied in a number of different arrangements and combination of parts but preferred embodiments of such parts and arrangement of parts will be described hereinafter in this specification and illustrated in the accompanying drawing which is a part hereof, and wherein.

Figure 1:
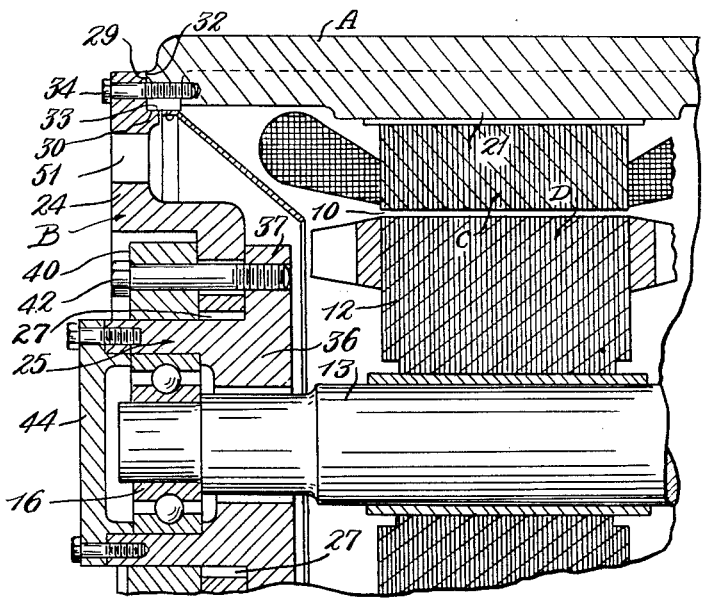
Figure 1 is a fragmentary, side sectional view of one end of a motor-alternator apparatus embodying the present invention and taken approximately on the line 1—1 of Figure 2.
Figure 2:
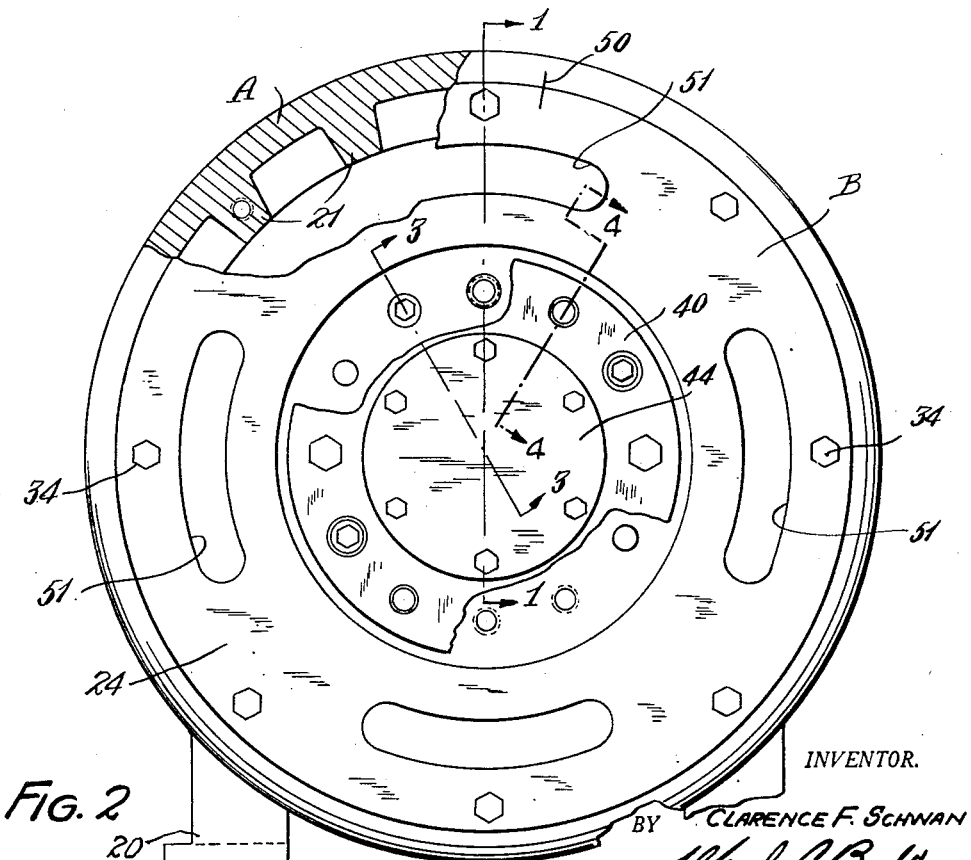
Figure 2 is an end view partly in section of the equipment shown in Figure 1.

Figures 3 and 4 are fragmentary sectional views taken on the line 3—3 and 4—4 of Figure 2 respectively.

Figures 5 and 6 are views similar to Figures 3 and 4 but showing an alternative embodiment of the invention.

Referring now to the drawings, the motor-alternator equipment, which is shown for the purposes of illustration only and not for the purposes of limitation, includes an outer shell made up of a housing member proper A and end-bell members B. A generator stator C is mounted in the housing member A and has a central bore 10 in which a generator rotor D is mounted in the end bells B for rotation coaxial with the bore 10. The rotor includes a stack of laminations 12 mounted centrally of the ends of a supporting shaft 13. As shown, the stack of laminations 12 substantially fills the bore 10 and the outer surface of the laminations closely approaches the inner surface of the stator C. This clearance between the rotor and stator is preferably held to a minimum and maintained uniform around the entire periphery of the bore 10. The ends of the shaft 13 are reduced in diameter and a ball bearing 16 fits over the end of the shaft and is, in turn, mounted in the end bell B as will be subsequently explained.

The housing member A is generally a hollow cylinder having a length and internal diameter sufficient to receive the stator and its associated equipment. Preferably, the housing member is made of a cast metal, although it may be fabricated by welding from steel plate. Mounting feet 20 are provided externally thereof so that the equipment may be fastened securely to a base support. The interior surface of the housing member A preferably has a plurality of longitudinally-extending ribs 21 to which the stator C is affixed, the ribs 21 providing cooling passages between the housing A and the outer surface of the stator C.

The end-bell members, of which there are two, are fastened to each end of the housing member A. As these members are identical in construction, only one is shown and only one will be described in detail. The end bell B is comprised of two members, an outer member 24 and an inner member 25. In this embodiment, the outer member and the housing member are so formed relative to each other that they have accurately interfitting or mating surfaces so that the outer member and the housing member may be readily assembled and disassembled into substantially, exactly-the-same, relative position. Thus, the outer member has a rabbet in its outer periphery forming a flat radial surface 29 and an outwardly-facing, circumferentially-extending surface 30. In a like manner, the ends of the housing have a flat radial surface 32 which abuts the surface 29 and an inwardly-facing, circumferential surface 33 which abuts the surface 30.

The criterion for the mating surfaces 29, 32 and 30, 33 is that when the outer member 24 and the housing member A are assembled, the abutting surfaces so coact and mate with each other so as to accurately position the outer member 24 relative to the axis of the bore 10 of the stator C. In practice, the surfaces 30, 33 may form an interference fit. Thus, the maximum of accuracy is insured upon reassembly. A continuous peripheral surface is not necessary. Flat surfaces or taper pins may also be employed for aligning these members.

A bolt 34 passes through openings in the member 24 and is threaded into the housing A. The openings are, preferably, oversize relative to the bolts 34 to facilitate insertion of the bolts. The bolts perform no function other than holding the members in assembled relationship.

The inner member 25 is so formed as to be adjustable in a plane perpendicular to the axis of rotation relative to the outer member and, when finally adjusted, to be fixed in this adjusted position by any suitable means. In the embodiment shown, the inner member comprises a sleeve portion 36 which extends through a central opening 27 in the outer member 24 and a flange 37 which extends radially outwardly and overlaps the inner periphery of the outer member 24. As shown, the outer diameter of the sleeve 36 is substantially less than the inner diameter of the bore 27. Thus, the inner member 25 is capable of considerable radial adjustment relative to the outer member 24. As shown, the flange 37 is positioned interiorly of the shell on the outer member 24. A ring 40 is positioned on the opposite side of the member 24 from the flange 37. This ring 40 has an inner diameter substantially equal to the outer diameter of the sleeve 36. The ring 40 and the inner member 25 when they have been adjusted to the desired relative position, are fixed relative to each other. This may be accomplished by the bolts 42 shown or dowels 43 may be employed through the ring 40 or the flange 37 or both, or the members may be welded into a unitary construction. In the event dowel pins are used, the bolts may pass through oversize openings.

The sleeve 25 is also counterbored on the inside to receive the bearing member 16. A cap 44 is provided on the end of the inner member 25 for covering over the end of the shaft 13 and the bearing 16. This prevents dirt from entering this area.

The invention also contemplates an improved method of motor assembly.

To assemble the motor alternator shown in the drawings in accordance with the invention, the rotor D is first positioned interiorly of the stator C. Shims are positioned between the rotor D and the stator C to accurately provide an even, uniform clearance around the entire periphery of the rotor. If any sag or bending of the shaft 13 is contemplated when the shims are removed and the weight of the rotor is borne by the bearings 16, the thickness of the shims on the lower side may be increased a desired amount to compensate for this contemplated sag. The end bell B, comprised of the inner and outer members 25 and 24 in loose assembled relationship, are then assembled with the housing A and the bolts 34 put into position. Because of the mating surfaces, the outer member 24 and the housing member A fit up into an accurate predetermined position. Subsequently, the bolts 42 are positioned to firmly clamp the inner and outer members 25 and 24 into fixed assembled relationship. If desired, the members may be drilled and dowel pins 43 inserted to further insure that this adjustment will not be disturbed accidentally. When this operation has been completed, the shims may be removed through suitable openings 51 in the end bell and the machine is then ready for operation. In the event there is any need for access to the interior of the equipment, it is only necessary to remove the bolts 34 and remove the end bell B as a unitary assembly and preserving the doweled adjustment. When the repair work is finished, the end bell may be quickly reassembled with the housing without need of further steps to align the rotor with the stator. Preferably, some locating means such as indicia 50 are provided for locating the circumferential position of the end bell relative to the housing A. The equipment is then ready for operation.

Figures 5 and 6 show one possible alternative arrangement of a shell construction embodying the present invention. In the embodiment shown in Figure 5, the end bell is comprised of an outer member 54 and an inner member 55, the inner member receiving the bearing 16 and supporting the rotor shaft 13. In this embodiment, the end of the housing A has a flat radial surface 56. The outer member 54, which is generally in the shape of a ring, has a pair of flat radial surfaces 63 and 64, the flat surface 63 abutting against the surface 56 of the housing A. Thus, it will be seen that the outer member 54 is so formed and constructed relative to the housing A that it can be adjusted radially relative thereto. The member 54 also has an inner peripheral, circumferentially-extending surface 65. The inner member 55 has a rabbet formed in its outer periphery providing a flat radial surface 66 and an outwardly-facing, circumferentially-extending surface 67. The diameter of the surface 67 is such as to accurately mate with the surface 65 on the outer member 54. The relative construction of these two members is such that the inner member 55 may be readily assembled, disassembled and reassembled with the ring 54 into exactly the same radial position.

In this embodiment, the members 54 and 55 are assembled and then this assembly is fitted as a unit to the end of the housing A. The member 54 is held in assembled adjusted relationship with the housing A by means of threaded bolts 60 which extend through loose fitting openings in the member 54 into threaded engagement with an opening in the housing A. Also, for accurately maintaining the relative adjusted position of the outer member 54 and the housing A, dowel pins 61 are tightly fixed into aligned openings in the two members. These last mentioned openings are, preferably, drilled when the final adjustment of the stator relative to the rotor has been made. To facilitate the drilling of these openings and the insertion of the screws 60, the inner member 55 is provided with a plurality of large holes 68 aligned with the axis of the bolt 60 and the pins 61.

It will also be appreciated that a construction of this type could be employed wherein the ring 54 has circumferentially-extending surfaces which mate with similar surfaces in the housing A and the inner member 55 is radially adjustable relative to the member 54.

Thus, it will be seen that preferred embodiments only of the invention have been described. Other embodiments of the invention will readily occur to others upon a reading and understanding of this specification. For example, other means may be provided for accurately locating two of the members relative to each other upon reassembly. The exact means employed is relatively unimportant so long as the assembly of the members can be done readily and easily with surety of accurate positioning. All errors of machining of the mating surfaces will have been compensated for by the relative adjustment of two other members in the initial assembly of the equipment.

In the specification, reference has been made to a unitary housing A and a multipiece end bell B. It will be appreciated that one of the members of the end bell could instead actually be a part of or forming extension of the housing without departing from the spirit of the invention.

Having thus described my invention, I claim:

1. In an electric motor, generator, and the like, including a rotor and a shell supporting a stator, that improvement which comprises a radially adjustable bearing support supporting said rotor, said support including a pair of relatively radially adjustable rings and means accessible from outside the motor for fixedly positioning said rings in an adjusted position, one of said rings being disposed relatively radially inward of the other, the inner ring being the direct bearing support for the rotor and the other ring being detachably connected to the shell, said other ring and the shell having means including coacting surfaces for insuring assembly and reassembly into the same exact relative position.

2. The device as set forth in claim 1 wherein said last-named means also includes circumferential indicia.

3. In an electric motor, generator, and the like, including a rotor and a shell supporting a stator, that improvement which comprises a radially adjustable bearing support supporting said rotor, said support including a pair of relatively radially adjustable rings and securing means including dowel means accessible from outside the motor for fixedly positioning said rings in an adjusted position, one of said rings being disposed relatively radially inward of the other, the inner ring being the direct bearing support for the rotor and the other ring being detachably connected to the shell, said other ring and the shell having means including coacting surfaces for insuring assembly and reassembly into the same exact relative position.

4. In an electric motor, generator and the like, including a rotor and a shell supporting a stator, that improvement which comprises a radially adjustable bearing support supporting said rotor, said support including a pair of relatively radially adjustable rings having radially extending, flat, overlapping surfaces in engagement with each other and means extending through each of said surfaces and accessible from outside the motor for fixedly positioning said rings in an adjusted position upon final assembly, one of said rings being disposed relatively radially inward of the other, the inner ring being the direct bearing support for the rotor and the other ring being detachably connected to the shell, said other ring and the shell having means including coacting surfaces for insuring assembly and reassembly into the same exact relative position.

References Cited in the file of this patent

UNITED STATES PATENTS

| Number | Name | Date |
|---|---|---|
| 1,344,527 | Waern | June 22, 1920 |
| 1,361,474 | Lippert-Bruenauer | Dec. 7, 1920 |
| 1,559,830 | Woodall | Nov. 3, 1925 |
| 1,865,088 | Daun | June 28, 1932 |
| 2,300,957 | Miner | Nov. 3, 1942 |
| 2,368,549 | Kendall | Jan. 30, 1945 |
| 2,380,867 | Packer | July 31, 1945 |
| 2,441,054 | Ardussi | May 4, 1948 |